United States Patent [19]

Yoshida

[11] Patent Number: 4,705,285
[45] Date of Patent: Nov. 10, 1987

[54] STABILIZER APPARATUS FOR TELESCOPIC TYPE FRONT FORK

[75] Inventor: Takao Yoshida, Kawaguchi, Japan

[73] Assignee: Honda, Tokyo, Japan

[21] Appl. No.: 807,635

[22] Filed: Dec. 11, 1985

[30] Foreign Application Priority Data

Dec. 12, 1984 [JP] Japan .............................. 59-188468[U]

[51] Int. Cl.⁴ .............................................. B62K 19/24
[52] U.S. Cl. .................................... 280/279; 280/277; 411/360; 411/546
[58] Field of Search ............... 280/276, 277, 279, 280; 411/360, 361, 352, 353, 354, 337, 546, 547, 368, 371, 372

[56] References Cited

U.S. PATENT DOCUMENTS

| | | | |
|---|---|---|---|
| 3,072,423 | 1/1963 | Charlton | 411/371 X |
| 3,560,132 | 2/1971 | Gulistan | 411/361 |
| 4,069,575 | 1/1978 | Sigmund | 411/361 X |
| 4,289,060 | 9/1981 | Emmett | 411/371 X |
| 4,512,592 | 4/1985 | Yoshioka | 280/279 |

Primary Examiner—John J. Love
Assistant Examiner—Mitchell J. Hill

[57] ABSTRACT

A stabilizer apparatus is provided for a telescopic type front fork having a pair of right and left movable fork members supporting a front wheel of a vehicle. The stabilizer apparatus comprising a stabilizer member having an end connected to each of the fork members and a resiliently deformable strength adjustment member positioned between each of the fork members and the corresponding end of the stabilizer member. The strength adjusting member comprises a bushing formed of a resilient material. The bushing is mounted in and fixed to a connecting opening in each end of the stabilizer member and is fastened to the movable fork member at an attaching base portion projecting from an upper end portion of the movable fork member.

6 Claims, 5 Drawing Figures

FIG.1
FIG.3
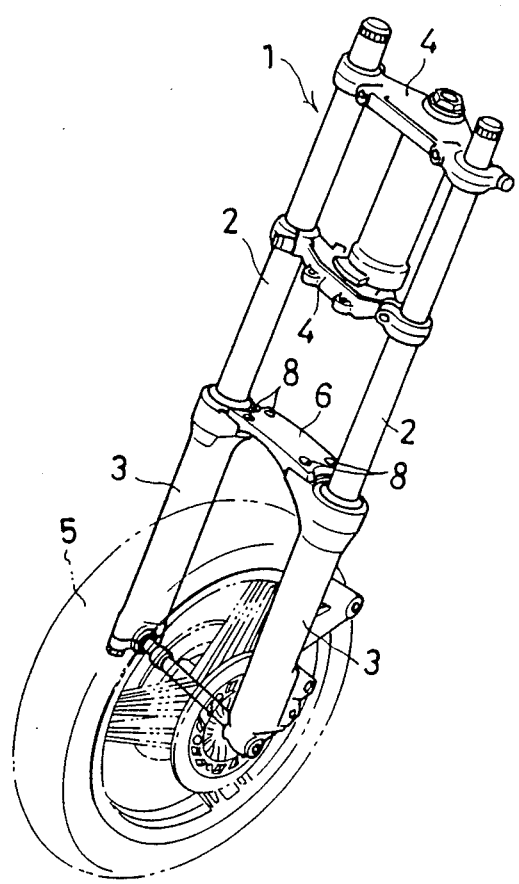
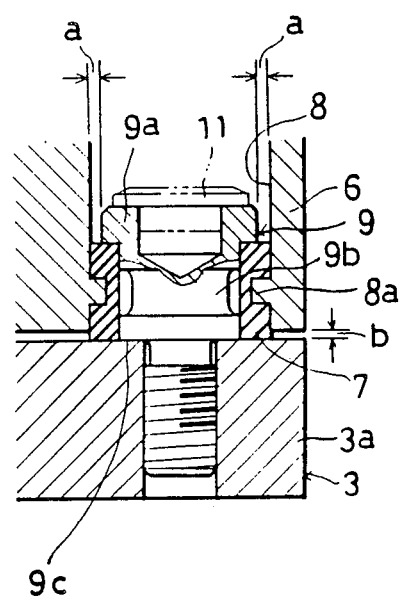

4,705,285

STABILIZER APPARATUS FOR TELESCOPIC TYPE FRONT FORK

BACKGROUND OF THE INVENTION

1. Field of the Invention

This invention relates to a stabilizer apparatus for a telescopic type front fork used for a motorized two-wheeled vehicle, a motorized three-wheeled vehicle or the like.

2. Description of the Prior Art

In prior art telescopic type front forks, a pair of right and left movable fork members, supporting a front wheel, are interconnected through a cross member type stabilizer to compensate for low lateral rigidity and/or torsional rigidity. It has been usual in this situation to immovably bolt the stabilizer directly to the movable fork member on each side thereof.

The optimum value of the lateral rigidity or of the torsional rigidity of a front fork varies with the kind of vehicles. Accordingly, it has been usual in the prior art that various stabilizers of different rigidity are prepared, and a proper one is selectively used in accordance with the kind of vehicle, so that the front fork has a desired lateral rigidity and/or torsional rigidity. This increases the cost of the fork since it is necessary to provide several different stabilizers in order to obtain any desired lateral rigidity and/or torsional rigidity.

SUMMARY OF THE INVENTION

It is the primary object of the present invention to provide a stabilizer apparatus for a telescopic type front fork of a vehicle in which the lateral rigidity and/or torsional rigidity of the stabilizer apparatus can be changed without changing the stabilizer member itself.

It is another object of the present invention to provide a stabilizer apparatus for a telescopic type front fork of a vehicle in which the lateral rigidity and/or torsional rigidity of the stabilizer apparatus can be changed merely by changing a deformable strength adjustment member positioned between the fork members and the stabilizer member of the apparatus.

The present invention is directed to a stabilizer apparatus for a telescopic type front fork having a pair of right and left movable fork members supporting a front wheel of a vehicle. The stabilizer apparatus comprises a stabilizer member having an end connected to each of the fork members and a resiliently deformable strength adjustment member positioned between each of the fork members and the corresponding end of the stabilizer member. The strength adjusting member comprises a bushing formed of a resilient material. The bushing is mounted in and fixed to a connecting opening in each end of the stabilizer member and is fastened to the movable fork member at an attaching base portion projecting from an upper end portion of the movable fork member.

BRIEF DESCRIPTION OF THE DRAWINGS

FIG. 1 is a perspective view of a telescopic type front fork of the present invention.

FIG. 3 is a sectional view taken along the line III—III in FIG. 2, showing a first embodiment of the present invention.

DETAILED DESCRIPTION OF THE PREFERRED EMBODIMENTS

Figure 2:
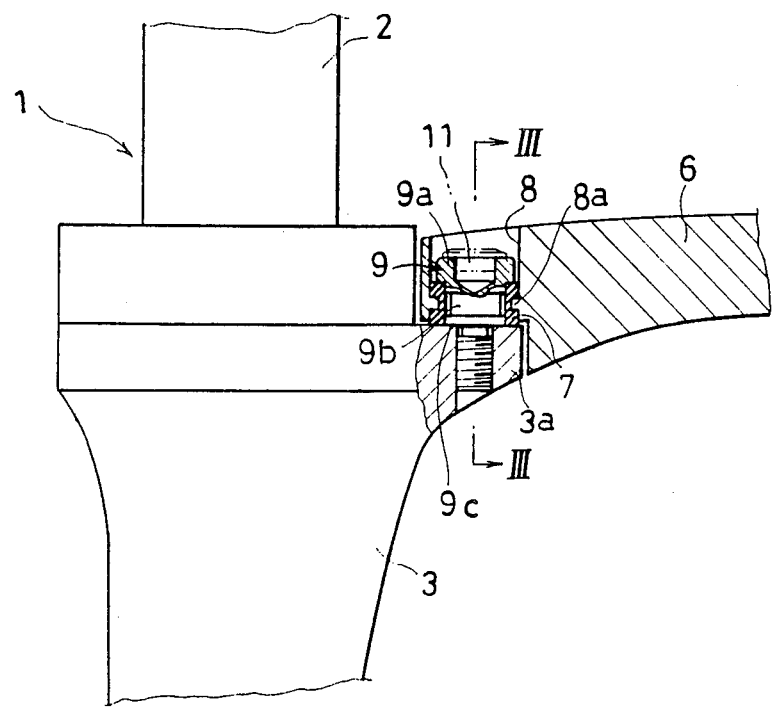
FIG. 2 is a sectional view of a stabilizer connecting portion thereof.

Referring to FIG. 1, a telescopic type front fork 1 comprises a pair of right and left stationary fork members 2, 2 on the upper side and a pair of right and left movable fork members 3, 3 on the lower side. The front fork 1 is steerably attached to a vehicle body through upper and lower bridges 4, 4 extending between the two stationary fork members 2, 2, and a front wheel 5 is pivotally supported on an axis between lower end portions of the two movable fork members 3, 3. Additionally, the two movable fork members 3, 3 are interconnected through a stabilizer 6 extending between upper end portions thereof such that the two movable fork members 3, 3 are prevented from large movement in the upper and lower directions as a result of an inclination movement caused by the action of a lateral load applied to the front wheel 5. The lateral rigidity of the front fork is thus raised.

The above described construction is not particularly different from that of a conventional apparatus. However, according to the present invention, the stabilizer 6 is connected to the movable fork member 3 on each side through a resiliently deformable strength adjustment member 7.

As shown in FIG. 2, the adjustment member 7 comprises a bushing made of resilient material such as synthetic resin, rubber or the like which is mounted in and fixed to a connecting opening 8 made in each end portion of the stabilizer 6. The adjustment member 7 is fastened, through a bolt 9 inserted therethrough, to an attaching base portion 3a projecting from an upper end portion of the movable fork member 3 on each side. The stabilizer 6 is thus connected to the attaching base portion 3a through the adjustment member 7.

As shown in FIG. 3, the head 9a of the bolt 9 is inserted into the connecting opening 8 so as to form an annular gap a therebetween, and a lower end portion of the adjustment member 7 projects slightly downwards from a lower surface of the stabilizer 6 so that a vertical gap b is formed between the stabilizer 6 and the attaching base portion 3a. Thus, the stabilizer 6 is arranged to be movable in right and left directions and in up and down directions, in relation to the attaching base portion 3a by the resilient deformation of the adjustment member 7.

In the illustrated example, the connecting opening 8 has an annular projection 8a so that the adjustment member 7 is fixed in the opening 8 by engagement thereof with the projection 8a. The head 9a of the bolt 9 is formed so that the outer diameter of the head 9a is larger than an inner diameter of the projection 8a, so that, even if the adjustment member 7 is broken and comes off, the stabilizer 6 is prevented from coming off by abutment of the head 9a with the projection 8a.

Additionally, the portion of the bolt 9 that faces the annular projection 8a is formed into a diametrically reduced portion 9b so that the stabilizer 6 is not obstructed in its right and left directional movements, even with the existence of the projection 8a.

The bolt 9 is provided with a shoulder portion 9c formed below the diametrically reduced portion 9b, and this shoulder portion 9c serves to regulate the fastening degree of the bolt 9 in relation to the adjustment member 7.

Figure 4:
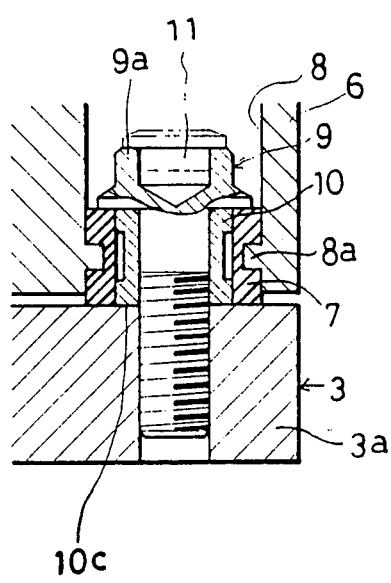
FIG. 4 is a sectional view of a second embodiment of the present invention.

FIG. 4 shows another embodiment of the present invention. In this embodiment, a collar 10 is mounted on the bolt 9 in place of the shoulder portion 9c of the preceding embodiment, and the shoulder portion 10c also serves to regulate the fastening degree of the bolt 9 in relation to the adjustment member 7.

Figure 5:
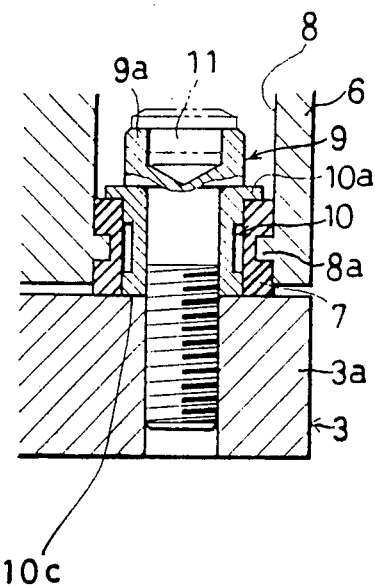
FIG. 5 is a sectional view of a third embodiment of the present invention.

In a further embodiment shown in FIG. 5, an upper end portion of the collar 10 is provided with a flange 10a which abuts the upper surface of the adjustment member 7. The outer diameter of the flange 10a is made larger than an inner diameter of the projection 8a so that the stabilizer 6 is prevented from coming off. A cap 11 is applied to the head 9a of the bolt 9.

Next, the operation of this invention apparatus will be explained as follows:

The stabilizer 6 is movable in relation to the movable fork member 3 on each side thereof due to the resilient deformation of the strength adjustment member 7. Accordingly, the lateral rigidity and the torsional rigidity of the stabilizer can be adjusted as desired, merely by selectively using an appropriate strength adjustment member 7, wherein different adjustment members have different resilient deformation properties, and it is not necessary to use different stabilizers.

Thus, according to the present invention, the front fork can be properly adjusted in its lateral rigidity and/or torsional rigidity merely by the use of an appropriate strength adjustment member. Thus, it is possible to use a single kind of stabilizer having a predetermined rigidity with various front forks in a wide range.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

I claim:

1. A stabilizer apparatus for a telescopic type front fork having a pair of left and right movable fork members supporting a front wheel of a vehicle, said apparatus comprising: a stabilizer bar having an end connected to each of the fork members and resilient connection means positioned between each of the fork members and the corresponding end of the stabilizer bar for permitting lateral and vertical movement of the stabilizer br relative to the fork members by resilient deformation of said connection means; said connection means comprising plural resiliently deformable adjustment members, each shaped as a bushing mounted in and fixed to a connecting opening in an end portion of said stabilizer bar, and a bolt fastening each said adjustment member to the movable fork member at an attaching base portion projecting from an upper end portion of the movable fork member, each bolt having a head inserted into the connecting opening wherein an annular gap is formed therebetween each adjustment member having a lower end portion projecting slightly downward beyond a lower surface of the stabilizer bar such that a gap is formed in the vertical direction between the stabilizer bar and the attaching base portion whereby resilient deformation of the adjustment members permits lateral and vertical movement of the stabilizer bar relative to the fork members.

2. A stabilizer apparatus as claimed in claim 1, wherein said connection means further comprises means for controlling the fastening degree of the bolt in relation to the adjustment member.

3. A stabilizer apparatus as claimed in claim 1 wherein said adjustment members are made of synthetic resin or rubber.

4. A stabilizer apparatus as claimed in claim 1, wherein the connecting opening has an annular projection therein engaging the adjustment member, and wherein the outer diameter of the head of the bolt is larger than an inner diameter of the projection.

5. A stabilizer apparatus as claimed in claim 4, wherein said means for controlling the fastening degree of the bolt in relation to the adjustment member comprises a collar mounted on said bolt.

6. A stabilizer apparatus as claimed in claim 5, wherein the collar has a flange on the upper portion thereof in abutment with an upper surface of the adjustment member, and wherein said connecting opening has an annular projection therein engaging the adjustment member and the outer diameter of the flange is larger that an inner diameter of the projection.

* * * * *